United States Patent [19]
Brandenburg et al.

[11] 4,387,084

[45] Jun. 7, 1983

[54] PROCESS FOR TREATING THIOSULFATE CONTAINING LIQUORS

[75] Inventors: Bruce L. Brandenburg, Wausau; Gerald L. Bauer, Rothschild, both of Wis.

[73] Assignee: Sterling Drug Inc., New York, N.Y.

[21] Appl. No.: 314,859

[22] Filed: Oct. 26, 1981

[51] Int. Cl.³ .............................................. C01B 17/00
[52] U.S. Cl. ................................ 423/567 A; 423/551; 423/519
[58] Field of Search ........... 423/551, 567, 571, 567 A, 423/519

[56] References Cited

U.S. PATENT DOCUMENTS

| | | | |
|---|---|---|---|
| 1,944,978 | 1/1934 | Hansen | 423/571 |
| 2,046,880 | 7/1936 | Miller | 423/567 |
| 3,855,390 | 2/1974 | Matumoto et al. | 423/236 |

FOREIGN PATENT DOCUMENTS

| | | | |
|---|---|---|---|
| 295859 | 4/1914 | Fed. Rep. of Germany | 423/557 |
| 49-23799 | 2/1974 | Japan | 423/551 |
| 49-98796 | 9/1974 | Japan | 423/551 |
| 52-1712 | 4/1977 | Japan | 423/236 |
| 394646 | 9/1931 | United Kingdom | 423/551 |
| 322312 | 11/1972 | U.S.S.R. | 423/551 |

OTHER PUBLICATIONS

Kirk-Othmer, *Encyc. of Chem. Tech.*, 2nd Edition; vol. 20, pp. 228-301.

Mizoguchi et al., Disproportionation of Thiosulfate, Trithionate, Tetrathionate and Sulfite Under Acidic Conditions, Bull. Chem. Soc., Japan, 49 (1), 70-75, (1976).

*Primary Examiner*—Herbert T. Carter
*Attorney, Agent, or Firm*—Allen H. Erickson; Thomas L. Johnson; B. Woodrow Wyatt

[57] ABSTRACT

A process for treating thiosulfate containing liquors such as coke oven gas scrubbing liquors by first adding acid, preferably sulfuric acid, to convert thiosulfate to elemental sulfur and bisulfite, separating and removing the elemental sulfur, and subjecting the remaining liquor to wet oxidation.

9 Claims, 1 Drawing Figure

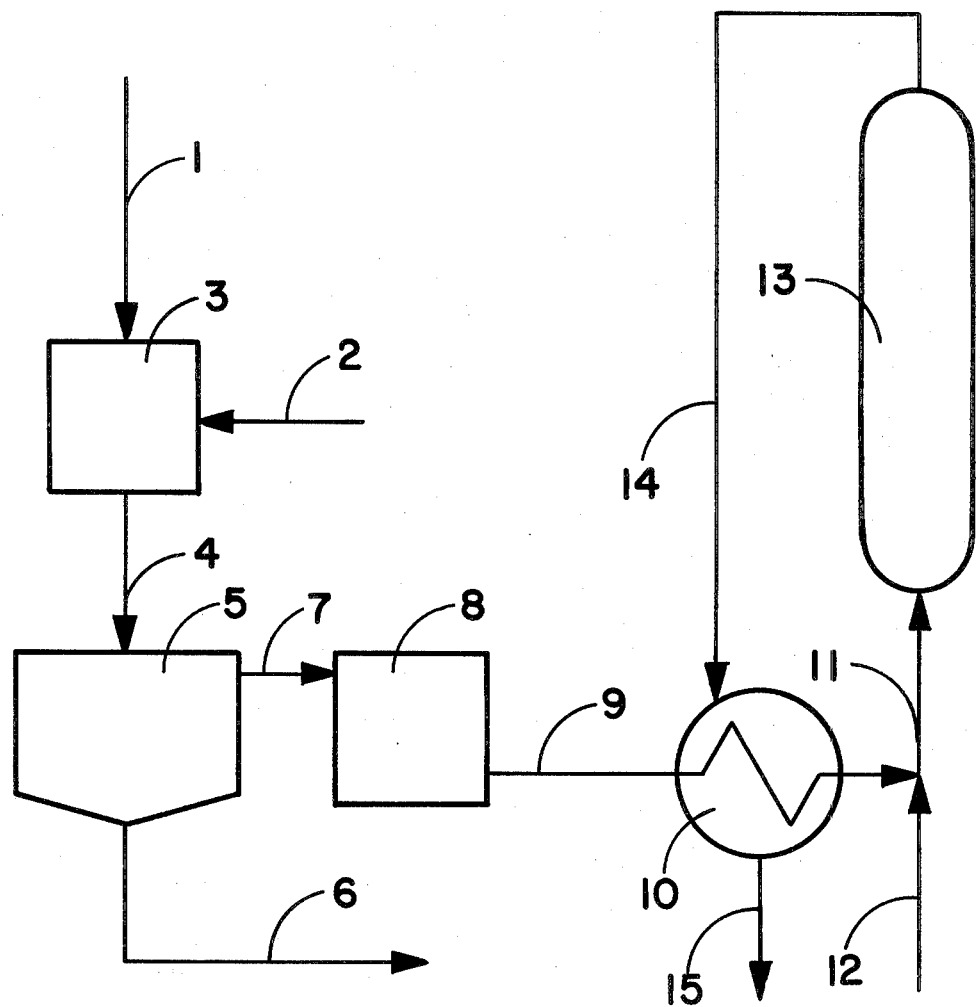

PROCESS FOR TREATING THIOSULFATE CONTAINING LIQUORS

BACKGROUND OF THE INVENTION

1. Field of the Invention

This invention relates to an improvement in treatment of thiosulfate containing liquors by wet oxidation.

2. Description of the Prior Art

The treatment of coke oven gas (COG) scrubbing liquors by wet oxidation is common in Japan and is becoming known in the United States and Canada. Coke oven gas scrubbing liquors typically contain ammonium thiocyanate, ammonium thiosulfate, ammonia, elemental sulfur, and some organics. The liquors may also contain small amounts of hydrogen sulfide and hydrogen cyanide. The average analyses of seven different COG liquors were as follows:

$NH_4SCN$: 60 g/l
$(NH_4)_2S_2O_3$: 65 g/l
$NH_3$: 3 g/l
Elemental S: 4 g/l
Total COD: 85 g/l
pH: 6-8

In conventional wet oxidation practice, the scrubbing liquor is pumped by a high pressure pump through a heat exchanger where the liquor is preheated, to a reactor where the oxidation takes place. Compressed air is mixed with the liquor before the liquor enters the heat exchanger, or alternately prior to entering the reactor. The heat of reaction released in the reactor raises the temperature from the inlet temperature at the reactor bottom to the outlet temperature at the top of the reactor. From the top of the reactor the oxidized liquor and exhaust vapors are conveyed back through the heat exchanger and out of the system through a pressure control valve. Conventional wet oxidation of COG scrubbing liquors is normally carried out at temperatures from 230° C. to 300° C. and at pressures from 500 pounds per square inch to about 2000 pounds per square inch (35 to 140 atmospheres).

Wet oxidation of COG scrubbing liquors is shown, for example in U.S. Pat. No. 3,855,390 to Matumoto et al., in which thiocyanates are oxidized to sulfates. Lime or limestone is added to the liquors prior to wet oxidation to avoid corrosion of the reactor by sulfuric acid. Free sulfur initially present in the scrubbing liquors is removed by filtration prior to wet oxidation.

In Japanese Patent Publication No. 1712, Jan. 17, 1977 of Nomoto et al., improved yield and purity of ammonium sulfate are claimed in wet oxidation of COG scrubbing liquors followed by gas-solid separation, evaporation and recycle of the small liquid stream.

Difficulties with conventional wet oxidation arise with the decomposition of thiosulfate which occurs during the oxidation process. When the waste scrubber liquor is mixed with air and heated to even moderate temperatures, 150° C. or higher, the ammonium thiosulfate begins to oxidize by the following mechanism:

$(NH_4)_2S_2O_3 + H_2O + 2O_2 \rightarrow (NH_4)_2SO_4 + H_2SO_4$

One mole of sulfuric acid is formed from each mole of ammonium thiosulfate contained in the feed. After enough sulfuric acid is formed to neutralize the excess ammonia originally contained in the liquor the pH rapidly drops to 3.0 or lower and the thiosulfate remaining unoxidized rapidly decomposes by the following reaction to give sulfite and elemental sulfur:

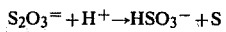

For a waste scrubber liquor with a composition the same as shown above as much as 7.5 to 11.2 grams per liter of sulfur could be formed at the beginning of the oxidation process.

Elemental sulfur is very resistant to oxidation, and even at oxidation temperatures of 230° to 290° C., all sulfur will not be oxidized from the waste liquor. Small amounts of sulfur in the feed, 4 grams per liter, can usually be handled in the wet oxidation systems. Some will oxidize and the remainder is carried out with the effluent as small suspended particles.

Larger amounts of elemental sulfur that result from decomposition of thiosulfate cause problems for wet oxidation reactors. One reactor with 20 g/l elemental sulfur in the feed was found to have completely filled up with liquid sulfur. In other cases the sulfur, a liquid at reactor temperatures, solidified on the surfaces of the heat exchangers causing blockage and loss of heat transfer efficiency. Sulfur has also been observed to solidify on the inner surfaces of the pressure control valve leading to blockage of flow.

Another undesirable affect of large amounts of elemental sulfur in a wet oxidation unit is that the acid formed in even a partial oxidation must be diluted with water to prevent corrosion of the wet oxidation unit. The dilution water increases pipe sizes and heat exchanger requirements and thus increases the cost of the wet oxidation system.

The formation of elemental sulfur from thiosulfate in acidic solutions at elevated temperatures is shown in a paper by Tadaaki Mizoguchi, Yoshiaki Takei and Taijiro Okabe entitled Disproportionation of Thiosulfate, Trithionate, Tetrathionate and Sulfite Under Acidic Conditions, Bulletin of the Chemical Soc. of Japan, Vol. 49 (1), pp. 70-75 (1976).

SUMMARY OF THE INVENTION

The instant invention comprises treatment of thiosulfate containing liquors in two stages with a sulfur removal step between the two stages. In the first stage, the liquors are acidified with a mineral acid, preferably sulfuric acid, decomposing the thiosulfate to bisulfite and elemental sulfur. The latter is removed from the liquors as solid particles by settling and/or filtration and may be subsequently recovered. The liquors, now essentially free of elemental sulfur, are treated by wet oxidation to convert remaining pollutants to primarily carbon dioxide, ammonium sulfate, and free sulfuric acid.

BRIEF DESCRIPTION OF THE DRAWING

The FIGURE is a schematic flow sheet of the process of the present invention.

DESCRIPTION OF THE PREFERRED EMBODIMENT

This invention is an improvement in the process of treating thiosulfate containing liquors by wet oxidation, whereby the elemental sulfur normally formed by an early step of oxidation is instead formed by acid treatment and removed from the liquors prior to wet oxidation.

The advantages of this improvement are as follows:

a. Plugging or loss of heat transfer capability of the wet oxidation heat exchangers due to solid sulfur deposition is avoided.
b. Accumulation of molten sulfur in the wet oxidation reactor is essentially eliminated.
c. The oxygen demand, measured as COD, of the liquor to be wet oxidized, is much reduced. The reduced air or oxygen requirement results in significant cost savings.
d. Elimination or reduction of elemental sulfur in the wet oxidation reactor makes possible complete or nearly-complete oxidation at lower temperatures and pressures than otherwise utilized. Thus, the wall thicknesses of the reactor and other equipment may be reduced.
e. The concentration of free acid in the wet oxidized liquor is much reduced, thereby ameliorating corrosiveness of the liquor. The need for dilution and/or equipment construction using exotic materials is less critical.

Referring now to the FIGURE, thiosulfate containing liquor 1 such as coke oven gas (COG) liquor is mixed with acid 2, preferably sulfuric acid, in a first stage reactor 3. The mixture 4 flows to a solids separation device such as a gravity settler where elemental sulfur 6 is removed as solid particles from the liquor. The liquor 7 essentially free of elemental sulfur is pressurized by pump 8 to a pressure at which a major portion of water in the liquor will remain as liquid at the elevated reactor temperature within reactor 13. The pressurized liquor 9 is preheated by indirect heat exchange in heat exchanger 10. Air or oxygen 12 is added to the heated liquor and the gas-liquid mixture 11 passes to the second stage, a wet oxidation reactor 13. A mixture 14 of oxidized liquor and offgases passes from reactor 13 through heat exchanger 10 to preheat the unoxidized liquor 9, and the cooled oxidized liquors 15 are discharged from the system.

In an alternate embodiment, the gas-liquid mixture 14 is separated into a gaseous and a liquid phase and the gaseous phase is separately discharged from the system.

The acid added in the first stage may be any acid capable of lowering the waste liquor pH to the 4-5 range required to initiate the thiosulfate decomposition. However, a mineral acid is better than an organic acid since the mineral acid will not add any COD to the wastewater. Sulfuric acid is the preferred acid since it adds nothing to the liquor that is not already present in or will not be formed by reactions in the oxidized waste and thus does not affect the corrosiveness of the scrubber liquor or the value of any by-products recovered from the oxidized waste liquor.

When the acid is added in the first stage two chemical reactions occur. The first is the neutralization of the free ammonia contained in the liquor by the reaction:

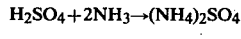

The second reaction is the decomposition of thiosulfate contained in the waste to bisulfite and elemental sulfur by the mechanism:

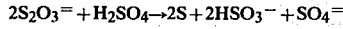

The sulfur thus formed is relatively pure and can be easily removed from the waste, for example, by gravity settling, flotation or filtration.

In accordance with this invention, sulfuric acid is added to the liquor at a preferred extent of at least 0.4 mole of $SO_4^=$ per mole of $S_2O_3^=$ in the liquor.

The acid addition stage can be carried out at any temperature and pressure where the liquor remains as a liquid. However, to minimize the cost of process equipment, the acid addition step is referably carried out at atmospheric pressure and at a temperature below the melting point of sulfur and sulfur is separated and removed from the liquor as solid particles. The several forms of sulfur melt at temperatures ranging from about 204° F. (95° C.) to 248° F. (120° C.); the higher temperature is generally considered the melting point for practical purposes.

The actual temperature used in the acid addition stage will depend upon economic and other considerations for the particular application. At 300° F. (150° C.) to 400° F. (204° C.) for example, slightly more sulfur can be precipitated from the waste using slightly less acid. When the first stage is operated at a temperature above the melting point of sulfur, the separation device 5 and pump 8 must be designed for the higher temperature and an elevated pressure, and the sulfur 6 will be discharged in a molten form. Alternately, stream 4 is cooled to a temperature where sulfur solidifies and is separated and removed as solid particles. Typically this temperature is 180° F. (82° C.) to 248° F. (120° C.), below the melting point of sulfur.

The second step of the process, the wet oxidation, can be a conventional wet oxidation process very similar to that of units currently being used to treat COG waste scrubbing liquors. Typical wet oxidation conditions are temperatures of 400°–550° F. (204°–288° C.) and pressures of 250–2000 psi (18–140 atmospheres). The essence of the invention, however, is the combination of the acid addition stage with the wet oxidation stage. In so doing, the free sulfur in the feed liquor is removed and the formation of free sulfur in the wet oxidation unit is eliminated. Thus the difficult task of oxidizing sulfur in the wet oxidation reactor is avoided.

Thus, in addition to the expected benefit of eliminating the sulfur load on the wet oxidation reactor there are several additional benefits of the invention that we have so far discussed.

1. In the acid addition stage approximately two moles of sulfur are precipitated for each mole of sulfuric acid added to the waste. Thus the amount of free acid present in the waste after oxidation is reduced by a considerable amount. This allows the treatment unit to operate with less dilution water, reducing the required size of the relatively expensive wet oxidation unit and thus saving a considerable amount of money in equipment costs.
2. Removing the precipitated sulfur from the waste liquor reduces the COD of the waste, reducing the amount of air required to oxidize the remaining pollutants contained in the waste. This in turn reduces the size of the compressor and piping needed to convey air or oxygen to, as well as offgases from the wet oxidation unit, further reducing the capital and operating costs of the treatment system.
3. The waste liquor, after removal of the precipitated sulfur is much easier to oxidize so that the design temperature and pressure of the wet oxidation unit may be reduced, further reducing capital and operating costs for the treatment system.

EXAMPLE

A COG waste scrubber liquor had the following composition:

| Component | Concentration (g/l) |
|---|---|
| NH₄SCN | 60 |
| (NH₄)₂S₂O₃ | 65 |
| S | 4 |
| NH₃ | 3 |
| COD | 85 |

As a basis for comparison, a sample of the waste liquor was treated by wet oxidation at 520° F. (271° C.) and the following oxidized product was obtained:

| Component | Concentration (g/l) |
|---|---|
| NH₄SCN | 0 |
| (NH₄)₂S₂O₃ | 0 |
| NH₃ | 0 |
| (NH₄)₂SO₄ | 174.0 |
| H₂SO₄ | 34.5 |
| S | 4.0 |

To demonstrate the present invention sulfuric acid was added to 30.1 g/l to another batch of the same waste liquor at ambient room temperature. After removing 18 g/l of precipitated elemental sulfur by filtration the composition of the waste liquor was:

| Component | Concentration (g/l) |
|---|---|
| NH₄SCN | 60 |
| (NH₄)₂S₂O₃ | 0 |
| S | 0 |
| NH₃ | 0 |
| NH₄HSO₃ | 43.5 |
| (NH₄)₂SO₄ | 40.6 |
| COD | 58 |

As a result of the acid addition step, free sulfur and the source of free sulfur (i.e., thiosulfate) were eliminated from the waste liquor. Moreover, the waste liquor COD was reduced from 85 g/l to 58 g/l.

The acid treated COD waste scrubber liquor was next treated by wet oxidation at 520° F. (271° C.) and the following oxidized product was obtained:

| Component | Concentration, (g/l) |
|---|---|
| NH₄SCN | 0 |
| (NH₄)₂S₂O₃ | 0 |
| S | 0 |
| NH₃ | 0 |
| (NH₄)₂SO₄ | 174 |
| H₂SO₄ | 21.5 |

The waste scrubber liquor treated according to the present invention now contained no elemental sulfur, and contained considerably less free sulfuric acid than the waste liquor treated by a conventional wet oxidation process.

We claim:

1. A process for the treatment of thiosulfate containing liquors which also contain oxidizable components including one or more of thiocyanate, cyanide, elemental sulfur and organic compounds, comprising:
   a. mixing said liquors with an acid to decompose thiosulfate to bisulfite and elemental sulfur;
   b. separating and removing said elemental sulfur from said acidified liquors to produce liquors essentially free of elemental sulfur and thiosulfate; and
   c. subjecting said sulfur free liquors to wet oxidation wherein remaining oxidizable substances including one or more of thiocyanate, cyanide and organic compounds are oxidized by air or oxygen at elevated temperatures and pressures.

2. The process according to claim 1, wherein the acid is a mineral acid.

3. The process according to claim 2, wherein the mineral acid is sulfuric acid.

4. The process according to claim 3, wherein the sulfuric acid is added to said liquors to the extent of at least 0.4 mole of $SO_4^=$ per mole of $S_2O_3^=$ in said liquors.

5. The process according to claim 1, wherein the acid is mixed with said liquors at a temperature of 60° F. (15° C.) to 400° F. (204° C.).

6. The process according to claim 1, wherein the acid is mixed with said liquors at a temperature below the melting point of sulfur, and elemental sulfur is separated and removed as solid particles.

7. The process according to claim 1, wherein the acid is mixed with said liquors at a temperature greater than the melting point of sulfur and the sulfur is separated and removed in molten form.

8. The process according to claim 1, wherein the acid is mixed with said liquors at a temperature greater than the melting point of sulfur and the acidified liquors containing elemental sulfur are cooled to a temperature below the melting point of sulfur before the elemental sulfur is separated and removed as solid particles.

9. The process according to claim 1, wherein said wet oxidation is carried out at a temperature of 400°–550° F. (204°–288° C.) and at a pressure of 250–2000 psi (18–140 atmospheres).

* * * * *